United States Patent
Henderson et al.

(10) Patent No.: US 6,561,040 B1
(45) Date of Patent: May 13, 2003

(54) METHOD AND APPARATUS FOR DETECTING ENVIRONMENTAL CONDITIONS UTILIZING MICRO-ELECTRICAL MECHANICAL DEVICES

(75) Inventors: J. Kirston Henderson, Fort Worth, TX (US); David L. Kellogg, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/231,472

(22) Filed: Jan. 14, 1999

(51) Int. Cl.$^7$ .............................................. G01B 11/16
(52) U.S. Cl. ......................................... 73/763; 73/777
(58) Field of Search .................... 73/763, 659, 514.38, 73/505, 514.15, 777, 775; 340/825.14, 10.1, 10.42, 10.6; 310/309; 136/244

(56) References Cited

U.S. PATENT DOCUMENTS

| | | | |
|---|---|---|---|
| 4,227,807 A | 10/1980 | Pond et al. ................... | 356/152 |
| 4,824,488 A | * 4/1989 | Sakai et al. ................... | 136/244 |
| 5,276,455 A | * 1/1994 | Fitzsimmons et al. ....... | 343/777 |
| 5,617,020 A | * 4/1997 | Campbell et al. ............ | 324/142 |
| 5,760,305 A | * 6/1998 | Greiff ....................... | 73/514.15 |
| 5,825,299 A | * 10/1998 | Fuentes et al. ........... | 340/10.42 |
| 6,155,490 A | * 12/2000 | Ackley ................... | 235/472.01 |

FOREIGN PATENT DOCUMENTS

| | | | |
|---|---|---|---|
| EP | 0 358 942 A2 | 8/1989 | ........... G08B/13/04 |
| EP | 0 554 186 A1 | 2/1993 | ......... H01L/27/144 |
| EP | 0 601 739 A2 | 11/1993 | ........... G08C/17/00 |
| FR | 2 701 142 A1 | 2/1993 | ............ G08B/5/36 |

OTHER PUBLICATIONS

Kiyama Seiichi: "Method and System For Simultaneous Supply Of Electric Power And Control Data", Patent Abstracts of Japan (EPO); Publ. No. 08047184; Publ. date Feb. 6, 1996.

* cited by examiner

Primary Examiner—Max Noori
(74) Attorney, Agent, or Firm—Hughes & Luce LLP

(57) ABSTRACT

A system and method to measure physical conditions at an object under test. This system comprises at least one micro-electro mechanical die module placed proximate to the object under test. The micro-electro mechanical die module is formed on a substrate and consists of at least one micro-mechanical transducer to monitor physical conditions, a series of integrated circuits electrically connected to the micro-mechanical transducer in order to read the output of the transducer, an internal photo voltaic device located on the substrate, and a transmitter internal to the micro-electro mechanical die module connected to the integrated circuits and a first antenna. A second antenna gathers signals transmitted by the micro-electro mechanical die module. The micro-electro mechanical die module transmits a signal when the photo voltaic device is scanned by a coherent light source. A receiver electrically connected to the second antenna receives and amplifies the signals transmitted by the micro-electro mechanical die module. The signals transmitted by at least one micro-electro mechanical die module are received by the receiver and processed to obtain data representative of the physical conditions at the object under test from the signals.

28 Claims, 2 Drawing Sheets

METHOD AND APPARATUS FOR DETECTING ENVIRONMENTAL CONDITIONS UTILIZING MICRO-ELECTRICAL MECHANICAL DEVICES

TECHNICAL FIELD OF THE INVENTION

The present invention relates generally to a system and method of sensing environmental conditions, and more particularly, to a system and method of detecting environmental conditions through the use of micro electrical mechanical devices.

BACKGROUND OF THE INVENTION

In building complex structures such as aircraft, buildings or ships a need arises to model physical conditions on the structure. Often this is accomplished using scale models of the structure in environmental chambers such as wind tunnels or wave tanks. This enables an understanding of the expected performance or design flaws of the structure prior to actually building the structure itself. For example, physical conditions such as pressure can be measured with transducers placed on the various surfaces (wings, tail, nose etc.) of a wind tunnel model. The data measured by the transducers can then be recorded and analyzed.

Transducers are typically installed by drilling holes and passages in the model for wires that run to the transducers located in or on the model, or air tubes that run to remotely located transducers. The problem arises in that placing transducers on the model in this manner makes the model very expensive to build and the number, location and position of the transducers limited. Therefore the amount of data available becomes limited.

An additional problem arises when testing actual conditions on the full scale structures. In flight testing of an airplane, one may want to install sensors on the aircraft in order to measure pressure on the leading edges, the wing and other various aerodynamic surfaces. This involves a great expense in placing the sensors inside the aircraft with a plethora of wires or air tubes running throughout the aircraft.

One solution that has attempted to increase the number of sensors point available on the structure has been to utilize Micro Electrical Mechanical Devices (MEMS). MEMS offer the integration of micro-machined mechanical devices and microelectronics on a single chip. These electromechanical devices may include discrete sensors to measure conditions such as pressure, vibration, temperature and the like. To put these devices on or in a structural model inside an environmental chamber such as a wind tunnel model could be an advantage. However, the plethora of wiring is still required to both power the MEMS and transfer the data gathered by the MEMS; therefore no significant practical or cost savings can be achieved by the use of these devices.

Thus, there is a need for an improved MEMS module which requires no external electrical connections.

There is a need for an improved system of gathering physical environmental data from a structure to be tested with remote sensors requiring no electrical connections.

Moreover, there is a need for an improved system of gathering physical environmental data from a structure to be tested with MEMS sensor modules which require no external electrical connections.

SUMMARY OF THE INVENTION

The present invention provides a system and method for detecting physical conditions at a structure that substantially eliminates or reduces disadvantages and problems associated with previously developed systems and methods for monitoring physical conditions at a structure.

More specifically, the present invention provides a micro-electro mechanical die module for monitoring physical environmental conditions at a structure. The micro-electro mechanical die module includes a substrate. At least one micro-mechanical transducer on the substrate is electrically connected to a plurality of integrated circuits on the substrate which read an output signal of the micro-mechanical transducer. A power supply is located on the substrate and electrically connected to the integrated circuits on the substrate. A transmitter on the substrate is electrically connected to the integrated circuits and an antenna on the substrate.

A second embodiment of the present invention provides a micro-electro mechanical die module for detecting physical environmental conditions at a structure, wherein the power supply is a photo-voltaic device excited by a coherent light source external to the micro-electro mechanical die module. This photo-voltaic device generates an electric potential when illuminated by a coherent light source. Furthermore, the integrated circuits on the substrate contain a read only memory in which has been encoded an identification code unique to the individual micro-electro mechanical die module. This unique identification code is included in an electromagnetic signal representing the output signal of the micro-mechanical transducer.

The present invention also provides a method of gathering physical data from a structure. The method includes the steps of placing a micro-electro mechanical die module proximate to the structure. The micro-electro mechanical die module is powered by an internal power supply. Physical conditions at the structure are converted to an output signal with a micro-mechanical transducer in the micro-electro mechanical die module. The output signal is amplified with integrated circuits electrically connected to the micro-mechanical transducer in the micro-electro mechanical die module and encoded with an identification code unique to the individual micro-electro mechanical die modules. This amplified signal is converted to and transmitted to the electromagnetic signal and transmitted to an external receiver. The received electromagnetic signal can then be processed to obtain data representative of the physical conditions at the location of the micro-electro mechanical die module.

The present invention provides an important technical advantage in that no external electrical connections to the MEMS module are required because the gathered data is transmitted and the device may be powered passively by a photo-voltaic device.

The present invention provides another technical advantage by gathering physical environmental data from a structure to be tested with remote sensors or transducer which do not require electrical connections eliminating often the costly installation of such connections.

The present invention provides another technical advantage by uniquely identifying an individual MEMS, module with a unique identification design of experiments (DOE) thus enabling the data gathered from a MEMS module to be uniquely associated with that particular MEMS module.

The present invention provides yet another technical advantage by activating the MEMS module with a coherent light source scanned onto the photo-voltaic device across an array of MEMS modules to ensure that only one MEMS module in the array is active and transmitting a signal at any point in time.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

The building of complex structures such as aircraft, buildings or ships creates a need to model physical conditions on the structure. This enables an understanding of the expected performance or design flaws of the structure prior to actually building the structure itself. Often this is accomplished using scale models of the structure in environmental chambers such as wind tunnels or wave tanks. In these chambers environmental conditions can controlled allowing an exact determination of the environmental effects on the structure. Physical data is often measured with various transducers placed on the structure. The data can then be recorded and analyzed.

Figure 1:
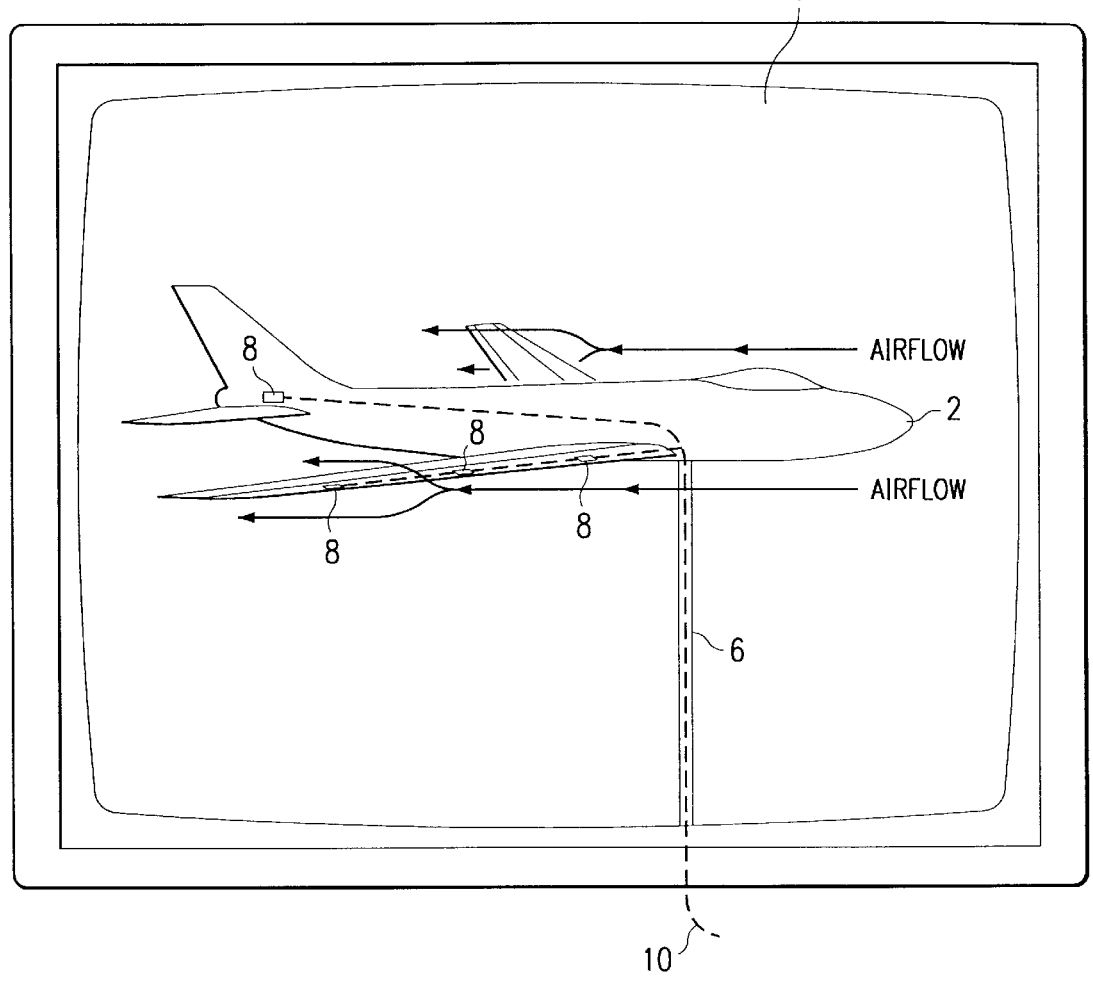
FIG. 1 illustrates a conventional system for gathering sensor information from a wind tunnel model.

FIG. 1 illustrates how system physical data can be gathered from a structure under test wherein the structure 2 under test (shown as a scale model of an aircraft) is placed inside an environmental test chamber 4 such as a wind tunnel. The structure under test may be mounted on a stand 6 and will be covered with a number of transducers 8 to monitor physical conditions such as the pressure of the air on various places on the surfaces of the structure 2 under test (such as a wind tunnel model). The transducers or sensors may be located on the wings, tails, structure and so forth of structure 2 under test. Transducers 8 are typically installed by drilling holes and passages in the structure 2 for wires 10 that run to the transducers 8 located in or on the structure 2. Placing transducers 8 on the structure 2 in this manner makes the structure 2 very expensive to build and limited in the number, location and position of transducers. Another solution (not shown) is to drill passages in the structure 2 that allow pressure to be sensed by remotely located transducers. This solution is also both expensive and limited. Furthermore, it is extremely difficult to apply either method to a full scale structure. Instrumenting a real aircraft to measure pressure, for example, on the leading edges, and various other aerodynamic surfaces is a very expensive and difficult process. Therefore the amount of data available also becomes limited.

Figure 2:
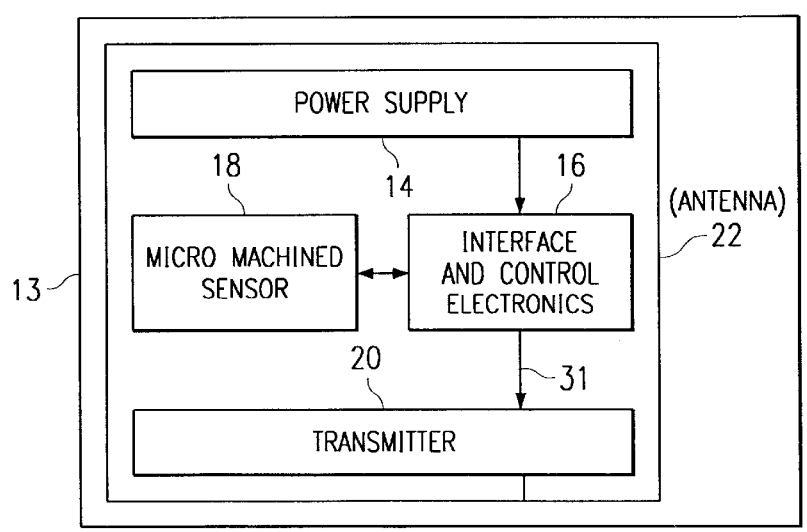
FIG. 2 illustrates a schematic of a MEMS module.
Figure 3:
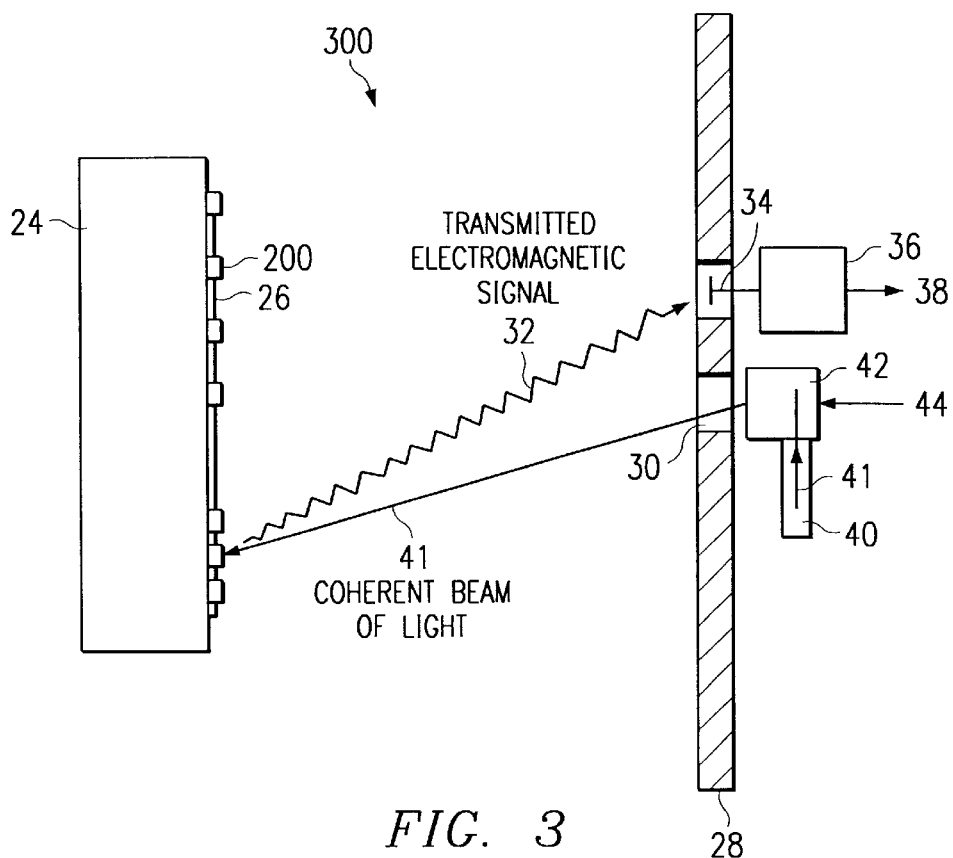
FIG. 3 illustrates one embodiment of a system to measure physical conditions with the present invention.
Figure 4:
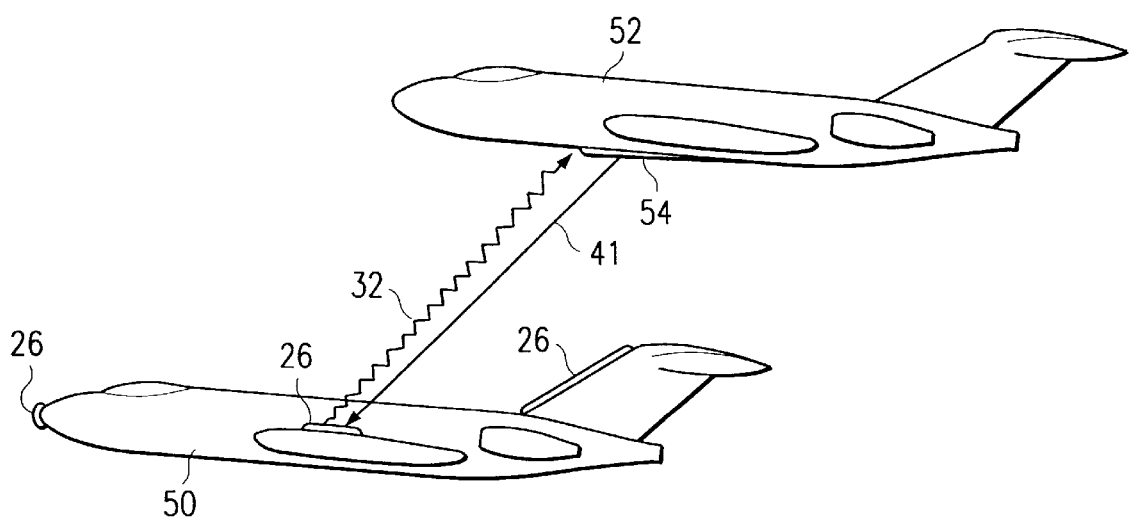
FIG. 4 is a diagram showing how the present invention can be used to gather physical data from an aircraft in flight.

FIG. 2 illustrates a micro-electro mechanical device (MEMS) 200. A MEMS module 200 is formed on substrate 13 which may be silicon but is not be limited to silicon. On the substrate 13 will be an internal power supply 14 which will provide an electrical potential to power the elements of the MEMS module 200. The power supply 14 may be formed on or connected to the substrate 13. The power supply 14 is electrically connected to a series of integrated circuits 16 which are solid state electronic circuits formed on the substrate 13 by the processes commonly used in semiconductor manufacture, as known by those skilled in the art of semiconductor manufacture. These circuits 16 control the individual components on the substrate and the interface between such components. A micro mechanical transducer 18, formed on the substrate 13, operably connected to the integrated circuits 16, can monitor physical parameters such as pressure, temperature, vibration, inertia or acceleration of the MEMS module 200. Transducer 18 may also be formed by processes commonly used in manufacture of semiconductors as known by those skilled in the art. The data gathered by the transducer 18 will be read by the integrated circuits 16 on the MEMS module 200 creating an electric signal 31. A transmitter 20 located on substrate 13 will be electronically connected to the integrated circuits 16 to provide a method of transmitting an electromagnetic signal 32, as shown in FIGS. 3 and 4. Electromagnetic signal 32 is representative of the physical parameters monitored by transducers 18 on the MEMS module 200. Transmitter 20 utilizes antenna 22, formed on substrate 13 to transmit the electromagnetic signal 32.

In another embodiment, the power supply 14 may be a photo voltaic device (not shown) or an array of photo voltaic devices. A photo voltaic device is any device which generates an electric potential when exposed to a light source. This light source may be a coherent light source such as a laser.

In a third embodiment, inside the integrated circuits 16, a memory location (not shown) may be available for encoding a unique identification code to each particular MEMS module. This unique identification code will in turn be transmitted with the signal representing physical parameters monitored by the transducers 18 on the MEMS module.

A fourth embodiment may incorporate both the photo voltaic devices (not shown) and the memory location (not shown) incorporated into the integrated circuits 16 providing a unique identification code for each particular MEMS module and wherein the transducers 18 may monitor at least one of the following physical parameters vibrations, pressure, temperature, inertia or acceleration of the MEMS modules.

FIG. 3 illustrates one embodiment of a monitoring system 300 used to monitor physical parameters at a structure. The monitoring system 300 includes a series of MEMS modules 200 that can be incorporated to form an array 26 of MEMS modules 200 placed upon the structure under test 24. The structure under test 24 may be isolated from the monitoring equipment by a protective structure 28. This boundary may be the exterior wall of a wind tunnel or an environmental chamber. Furthermore, this boundary may serve to isolate and protect the monitoring equipment from the physical conditions to which the structure under test 24 has been exposed. External to the protective structure 28 from the structure under test 24, a collimated light source 40 will generate a coherent beam of light 41 which will have a path of propagation. A beam steering device 42 will be placed in the path of propagation of the coherent beam of light 41. The beam steering device 42 receives a control signal 44 from a processor or control unit (not shown). The control signal 44 will allow the beam steering device 42 to redirect the collimated beam of light 41 to the individual MEMS modules 200 forming the array 26 on the surface of the structure under test. The redirected coherent beam of light 41 will pass through a transparent window 30, wherein the transparent window is made of such a material that it will not interfere with or impede the transmission of the coherent beam of light. When the individual MEMS modules (system 200) are illuminated by the redirected coherent beam of light 41, the photo voltaic device (not shown) forming the power supply 14 of the MEMS module 200 will generate an electric potential, allowing the integrated circuits 16 to read physical parameters at the location of the MEMS module on the structure under test. In turn, this information will be transmitted via an electromagnetic signal 32. A receiving antenna 34 may be placed at the boundary to gather the electromagnetic signal 32. A receiver 36 will be electrically connected to the receiving antenna in order to receive and amplify the electromagnetic signal 32. A processor (not shown) may be connected to receive the output signal 38 of the receiver 36. This processor will process the output signal 38 in order to obtain data representative of the physical parameters at the MEMS module on the structure under test 24.

FIG. 4 presents a use of the present invention where the MEMS modules 200 are placed on the exterior structure of a test aircraft 50. These MEMS modules are monitored by a second aircraft 52. Structure 54 serves as the boundary 28 shown in FIG. 3 to protect the monitoring equipment. A coherent beam of light 41 is generated as discussed in FIG. 3 from the second aircraft 52 and directed to the MEMS modules 200 mounted on test aircraft 50. The MEMS modules 200 generate an electromagnetic signal 32 representative of physical conditions at the test aircraft 50. This electromagnetic signal is transmitted to a receiving antenna 34 shown in FIG. 3 located within aircraft 52 shown in FIG. 4. The electromagnetic signal is then processed as discussed in the description of FIG. 3.

MEMS modules 200 can be designed to transmit only when illuminated by coherent beam of light 41. The coherent beam of light 41 can be scanned across array 26 of MEMS modules 200. During this scan, only a single MEMS module 200 is illuminated at any point in time. This ensures that only one MEMS module 200 of array 26 will transmit at any point in time.

In another embodiment, the MEMS modules 200 are encoded with a unique identification code for each individual MEMS module 200. The electromagnetic signal 32 representative of the physical parameter at the structure under test 24 also contains this unique identification code. This method serves to uniquely identify the individual transmitting MEMS module 200 allowing a user who recorded the individual position of MEMS modules 200 to quickly identify the location of the monitored physical and improve the value of the gathered data.

An additional embodiment of the present invention incorporates both the photo voltaic device (not shown) power supply 14 of the MEMS module 200 and the unique identification code of the MEMS module 200 to further eliminate confusion at the receiver 36 and processor (not shown) to enable the user to identify the transmitting MEMS module 200. This is accomplished by the redirected coherent beam of light 41 being scanned across array 26 of MEMS modules 200. During this scan, only a single MEMS module 200 is illuminated at any point in time. Only illuminating one MEMS module 200 at a time ensures that only one MEMS module 200 of array 26 will be active and transmit at any point in time. Having only one MEMS module 200 transmit will prevent interference or a degradation in the electromagnetic signals 32 by the simultaneous transmission of multiple MEMS modules 200 from array 26.

The present invention also allows the user to place an array 26 of MEMS modules 200 on a structure under test 24 when the structure is not isolated in an environmental isolation chamber. The MEMS array 26 can be placed on an actual aircraft or other structure in order to monitor physical parameters from various points on the structure. In this embodiment, the boundary 28 as shown in FIG. 3 may be the exterior wall of a second vehicle such as aircraft 52 as shown in FIG. 4, thus allowing the user to monitor real time physical parameter on an actual first aircraft 50 in flight avoiding the expensive cost of a full size wind tunnel or environmental chamber.

Although the present invention has been described in detail, it should be understood that various changes, substitutions and alterations can be made thereto without departing from the spirit and scope of the invention as described by the appended claims.

What is claimed is:

1. A micro-electro mechanical device comprising:
a substrate;
at least one micro-mechanical transducer fabricated on the substrate;
a plurality of integrated circuits fabricated on the substrate electrically connected to at least one micro-mechanical transducer, and wherein the plurality of integrated circuits on the substrate contain a read only memory in which has been encoded an identification code unique to an individual micro-electro mechanical device, and wherein the unique identification code is included with an electromagnetic signal representing at least one parameter monitored by the micro-mechanical transducer;
an electrical power supply fabricated on the substrate electrically connected to the integrated circuits on the substrate;
a transmitter fabricated on the substrate electrically connected to the integrated circuits; and
an antenna fabricated on the substrate connected to the transmitter.

2. The micro-electro mechanical device of claim 1, wherein the electrical power supply is a photovoltaic device formed on the substrate.

3. The micro-electro mechanical device of claim 2, wherein the photovoltaic device is excited by a coherent light source external to the micro-electro mechanical device.

4. The micro-electro mechanical device of claim 3, wherein the coherent light source is a laser with a beam size no greater than the micro-electro mechanical device.

5. The micro-electro mechanical device of claim 1, wherein the micro-mechanical transducer monitors at least one of a group of characteristics consisting of temperature, pressure, vibrations, and acceleration on which the micro-electro mechanical device is placed.

6. The micro-electro mechanical device of claim 5, wherein the electrical power supply is at least one photo voltaic device, and wherein at least on photo voltaic device generates an electrical potential when illuminated by coherent light.

7. The micro-electro mechanical device of claim 6, further comprising:
a memory location in the integrated circuits on the substrate containing identification code unique to an individual micro-electro mechanical device, and wherein the unique identification code is included with an electromagnetic signal from the transmitter representing characteristics monitored by the micro-mechanical transducer.

8. A micro-electro mechanical device, comprising:
a substrate;
at least one micro-mechanical transducer fabricated on the substrate;

a plurality of integrated circuits fabricated on the substrate electrically connected to the micro mechanical transducer wherein the integrated circuits on the substrate contain a read only memory in which is encoded an identification code unique to the individual micro-electro mechanical device wherein the unique identification code is included with an electromagnetic signal representing at least one parameter monitored by the micro-mechanical transducer;

a power supply comprising at least one photovoltaic device electrically connected to the integrated circuits on the substrate;

a transmitter on the substrate electrically connected to the integrated circuits; and an antenna on the substrate connected to the transmitter.

9. The micro-electro mechanical device of claim 8, wherein at least one photo voltaic device generates an electrical potential when illuminated by a coherent light source.

10. The micro-electro mechanical device of claim 9, wherein the coherent light source is a laser with a beam with a size no greater than the size of the micro-electro mechanical device and wherein the transmitter transmits an electromagnetic signal to an external receiver only when the photo voltaic device is illuminated by the coherent light source.

11. The micro-electro mechanical device of claim 10, wherein the micro-mechanical transducer monitors at least one of a group of characteristics consisting of temperature, pressure, vibrations, and acceleration on which the micro-electro mechanical device is places.

12. A method of monitoring physical parameters about a structure comprising the steps of:

providing at least one micro-electro mechanical device at a location proximate to the structure;

providing power to the micro-electro mechanical device from a source contained on or in the micro-electro mechanical device;

converting physical conditions to an output signal, at least one micro-mechanical transducer in the micro-electro mechanical device performing the conversion;

amplifying the output signal, a plurality of integrated circuits electrically connected to at least one micro-mechanical transducer in the micro-electro mechanical device performing the amplification;

encoding an identification code unique to an individual micro-electro mechanical device wherein the unique identification code is transmitted with an electro magnetic signal representing parameters monitored by the micro-mechanical transducer;

transmitting the electromagnetic signal to an external receiver;

receiving the electromagnetic signal, the external receiver; and processing the electromagnetic signal to obtain data representative of the physical parameters monitored at the location of the micro-electro mechanical device.

13. The method of claim 12, wherein the step of providing power to the micro-electro mechanical device from a source contained on or in the micro-electro mechanical device further comprises:

illuminating the power supply of each of said at least one micro-electro mechanical devices individually with a coherent light source wherein the power supply comprises at least one photo voltaic device which generates an electrical potential when illuminated by the coherent light source and the power supply is electrically connected to the integrated circuits on the substrate.

14. The method of claim 13, wherein the step of transmitting the electromagnetic signal to an external receiver further comprises:

transmitting the electromagnetic signal to an external receiver only when at least one photovoltaic device is illuminated by the coherent light source.

15. The method of claim 12, wherein in the step of converting physical conditions to an output signal, the physical conditions converted are selected from the group consisting of pressure, temperature, vibrations, inertia and acceleration.

16. A system to measure physical conditions at an object under test comprising:

at least one micro-electro mechanical device placed proximate to the object under test, the micro-electro mechanical device comprising:

a substrate;

at least on micro-mechanical transducer fabricated on the substrate;

a plurality of integrated circuits fabricated on the substrate electrically connected to at least one micro-mechanical transducer;

an electrical power supply fabricated on the substrate electrically connected to the integrated circuits on the substrate;

a transmitter on the substrate electrically connected to the integrated circuits; and a first antenna on the substrate connected to the transmitter;

a second antenna to gather signals transmitted by the micro-electro mechanical device;

a receiver electrically connected to the second antenna to receive and amplify the signals transmitted by the micro-electro mechanical device;

a processor, electrically connected to the receiver, that obtains data representative of the physical conditions at the object under test from the signals transmitted by the micro-electro mechanical device; and a memory location in the integrated circuits on the substrate containing an identification code unique to an individual micro-electro mechanical device wherein the unique identification code is included with an electromagnetic signal from the transmitter representing acceleration date representative of an output signal generated by the micro-mechanical transducer.

17. The system of claim 16, wherein the electrical power supply is at least one photo voltaic device which generates an electrical potential when illuminated by coherent light, further comprising:

a coherent light source to emit a collimated beam of light having a path of propagation; and a beam steering device placed in the path of propagation of the collimated beam of light to redirect the beam of light to individual micro-electro mechanical devices proximate to the object under test.

18. The system of claim 17, further comprising:

an array formed from a plurality of micro-electro mechanical devices placed proximate to the object under test.

19. The system of claim 18, wherein the beam steering device is commanded by a control signal to scan the array formed from a plurality of micro-electro mechanical devices wherein individual micro-electro mechanical devices are not simultaneously illuminated by the collimated beam of light.

20. The system of claim 17, further comprising:
an environmental chamber to isolate the object under test from a surrounding environment allowing controlled physical conditions of a test; and
a window transparent to the collimated beam of light allowing placement of the beam steering device external to the environmental chamber.

21. The system of claim 20, wherein the second antenna, the receiver and the processor are external to the environmental chamber.

22. The system of claim 20, wherein the environmental chamber is a wind tunnel.

23. The system of claim 18, further comprising:
a protective structure with an outer wall to protect the coherent light source, the beam steering device, the second antenna, the receiver and the processor from the physical conditions at the object under test; and
a window in the outer wall of the protective structure transparent to the collimated beam of light thus protecting the beam steering device from the physical conditions at the object under test.

24. The system of claim 23, wherein the outer wall of the protective structure comprises an exterior wall of a first vehicle and wherein the array is placed on the object under test.

25. The system of claim 24, wherein the object under test is a first aircraft on which is placed the array, and wherein at least one of the micro-electro mechanical devices is illuminated by the collimated beam of light originating from a second aircraft having the protective structure.

26. A method of sensing environmental data proximate to an object comprising the steps of:
providing at least one micro-electro mechanical device on an object, wherein the step of providing at least one micro-electro mechanical device on the object further comprises embedding or placing an array of micro-electro mechanical device in a surface of the object, and wherein the micro-electro mechanical device comprises:
a substrate;
at least one micro-mechanical transducer on the substrate;
a plurality of integrated circuits on the substrate electrically connected to the micromechanical transducer;
an electrical power supply located on the substrate electrically connected to the integrated circuits on the substrate, wherein the electrical power supply of the micro-electro mechanical device comprises a photo-voltaic device which generates an electrical potential to power the micro-electro mechanical device when illuminated by a beam of coherent light, and wherein the array of the micro-electro mechanical device on the object is scanned with a coherent light source wherein the coherent light source does not simultaneously illuminate multiple micro-electro mechanical devices in the array;
a transmitter on the substrate electrically connected to the integrated circuits; and
an antenna on the substrate connected to the transmitter, wherein said transmitter transmits the output signal from the micro-electro mechanical device to an external receiver;
converting environmental conditions at the object to an output signal representative of the environmental conditions, the micro-mechanical transducer on the micro-electro mechanical device performing the conversion;
transmitting the output signal from the micro-electro mechanical device to an external receiver;
receiving the output signal, the external receiver performing the reception; and
processing the output signal to obtain data representative of the environmental conditions at the micro-electro mechanical device on the object.

27. The method of claim 26, wherein in the step of providing at least one micro-electro mechanical device on an object, the electrical power supply of the micro-electro mechanical device comprises a photo-voltaic device which generates an electrical potential to power the micro-electro mechanical device when illuminated by a beam of coherent light.

28. The method of claim 26, wherein in the step of providing at least one micro-electro mechanical device on an object, the object is located inside a wind tunnel.

* * * * *